# 2,836,592

CHLORINATION PROCEDURE

Constantine E. Anagnostopoulos and Eu-Phang T. Hsu, St. Louis, Mo., assignors to Monsanto Chemical Company, St. Louis, Mo., a corporation of Delaware No Drawing. Application November 25, 1955
Serial No. 549,187

15 Claims. (Cl. 260—239.3)

This invention relates to a useful and novel procedure for the preparation of the 3,3-dihalo-2-ketohexamethyleneimines which compounds are useful intermediates in the preparation of valuable amino acids. The new process is important since it provides more useful methods than have heretofore been used in the preparation of such intermediates.

In accordance with the teachings of the prior art 3,3-dichloro-2-ketohexamethyleneimine has been prepared by reacting ε-caprolactam with large excesses of phosphorus pentachloride in toluene solutions. This procedure is objectionable because of the low yields of 30 to 40 percent of the desired compound and is also uneconomical in view of the large amount of phosphorus pentachloride required. Furthermore, the prior art method involves a distillation procedure at a very low pressure (0.3 mm. of mercury).

The primary purpose of this invention is to provide an industrially practicable process for the preparation of the 3,3-dihalo-2-ketohexamethyleneimines. More specifically, the purpose of this invention is to provide methods by which higher yields of the desired compound are obtained and which involve the use of procedures which are readily adaptable to large scale manufacture. Further purposes of this invention will be evident from the following description.

It has been found that more satisfactory procedures involve two-stage halogenation reactions, the first stage utilizing halogenation reagents which are capable of converting carboxylic acids to the corresponding acid halides, including phosphorus halides, such as phosphorus pentachloride, phosphorus pentabromide, phosphorus trichloride and phosphorus tribromide; the carbonyl halides such as phosgene and carbonyl bromide; the thionyl halides, such as thionyl chloride and thionyl bromide. This part of the reaction is conducted at temperatures below the boiling point of the reaction mixture, for example temperatures below 40° C. and preferably between —40° and +20° C., which is a lower temperature than has been utilized by the prior art. The first stage of the reaction utilizes less than a large excess of chlorinating agent, for example stoichiometric proportions, or at the most a very small excess of reagents instead of the very large excess required by the prior art procedure.

The second halogenation stage of this novel method utilizes as halogenation agents, compounds which are elemental halides, such as chlorine and bromine. or sulfuryl halides, such as sulfuryl chloride and sulfuryl bromide, or other reagents which dissociate under the conditions of reaction to form the elemental halogens, for example sulfuryl halides such as sulfuryl chloride and sulfuryl bromide. This step of the reaction is conducted at relatively low temperatures, for example from 0° C. up to the boiling point of the reaction mixture and preferably temperatures between 20 and 50° C.

Both stages of halogenation are conducted in the presence of suitable solvent, for example xylene, toluene, chloroform, trichloroacetic acid, chlorobenzenes and ethylenetrichloride. The solvents of choice are the polar chlorinated alkanes, such as chloroform, ethylenetrichloride, and dichloromethane. After both stages of halogenation are complete the solvent is evaporated by heating the solution, preferably under vacuum, and when the reaction mixture is freed of solvent, it is poured into cold water, onto ice or a mixture of ice and water. The desired 3,3-dihalo-2-ketohexamethyleneimine separates as crystals which can readily be filtered from the water. The reaction produces the desired compounds in substantial yields, for example 90 or more percent under optimum conditions.

The two-stage reaction is believed to proceed by the following mechanism. The first stage of halogenation forms a compound by the substitution of a halogen atom for the hydroxyl group in the tautomeric form of the amide, structure A, in accordance with the following reaction to form compound B.

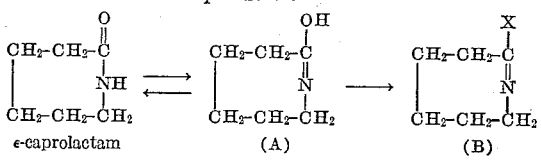

Compound B then rearranges to form compound C which is halogenated by elemental halogen in the second stage of the reaction to form compound D which by spontaneous loss of hydrogen halide forms E.

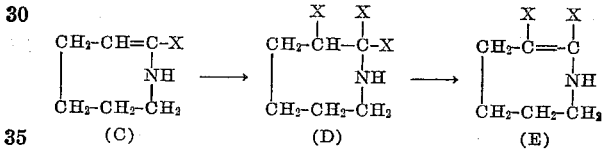

The second stage of halogenation adds halogen to the double bond of compound E to form compound F, which loses one mole of hydrogen halide to form compound G, and upon hydrolysis, compound G is converted to the 3,3-dihalo-2-ketohexamethyleneimine.

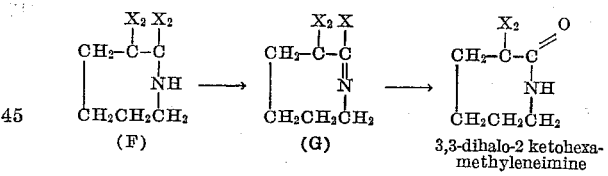

The above described reactions are not believed to proceed in the described sequence, many taking place simultaneously. Many of the intermediates may be present in the reaction mass at all times. The limited supply of the halogenating agent at the outset will tend to interrupt or slow down the reaction at about compound C and further reaction and expedited rate of reaction are promoted by supplying the other type of agent, for example the elemental halogen.

The mechanism as described has not been conclusively proved, but it is a reasonable explanation which accounts for the higher yields of the new process. Accordingly, the invention is defined by the manipulative steps of combining reagents under precise physical and chemical conditions. Since none of the intermediates are separated as such from the reaction mixture, and are not known to be separable, the two step halogenation reaction is a unitary procedure and not an aggregation of a plurality of distinct methods.

Further details are set forth with respect to the following specific examples:

*Example 1*

A glass reaction flask is charged with ε-caprolactam dissolved in chloroform. A stoichiometric proportion of phosphorus pentachloride is gradually added over a forty-eight minute period. After each increment of addition the mixture is stirred until the charged reactant dissolves before the next increment is added. The reaction mixture at all times is maintained between 25 and 30° C. by cooling in an ice bath. The resulting clear yellow solution is placed in a vessel provided with a thermometer, a stirring mechanism, a water cooled reflux condenser and a gas inlet tube. Dry chlorine gas is then passed into the mixture for 1.5 hours. During this period the temperature in the reaction vessel rises to about 45° C. The reaction vessel is then heated to 50° C. in a hot water bath and the solvent evaporated by subjecting the solution to a moderate vacuum. The resulting yellow oil is then poured into an ice-water mixture and a 76 percent of theoretical yield is recovered. Upon recrystallization from hot ethanol the product, 3,3-dichloro-2-ketohexamethyleneimine, having a melting point of 126–127° C. is obtained.

*Example 2*

The procedure of the previous example is repeated except that the phosphorus pentachloride is reacted with ε-caprolactam in a solution of ethylenetrichloride. The second stage of chlorination is effected by the use of sulfuryl chloride. A 73 percent yield of a well crystallized product is recovered.

*Example 3*

The reaction is conducted by dissolving ε-caprolactam in o-dichlorobenzene and successively contacting the solution with phosgene and with chlorine, each step proceeding until the reaction is complete as evidenced by the evolution of heat. The reaction mixture is then poured into an ice-water mixture to effect the separation of the 3,3-dichloro-2-ketohexamethyleneimine.

*Example 4*

The procedure of Example 1 is repeated except that a stoichiometric proportion of thionyl chloride is used for the initial chlorination. After completing the chlorination with chlorine gas and quenching, the desired product is recovered by filtering the quenching medium. After recrystallization from ethanol the product having a melting point of from 124–125° C. is recovered.

*Example 5*

The procedure of Example 1 is repeated except that 125 percent of the stoichiometric equivalence of phosphorus pentachloride is first reacted with the ε-caprolactam at a rate which permits the maintenance of the temperature below the reflux temperature. As soon as the reaction subsides, chlorine gas is introduced until the reaction medium is saturated. After evaporation of the solvent medium, the reaction mass is poured into cold water whereupon the crystalline product is separated. The white crystalline solid so obtained in an 80 percent yield is identified as 3,3-dichloro-2-ketohexamethyleneimine.

*Example 6*

The procedure of Example 2 is repeated except that phosgene is used in the first chlorination procedure and the reaction completed by subsequently chlorinating with sulfuryl chloride. The white crystalline, 3,3-dichloro-2-ketohexamethyleneimine is thereby recovered upon filtration of the quenching medium.

*Example 7*

A 200 ml. flask is charged with 55 ml. of chloroform and 5.6 g. of caprolactam. Phosphorus pentachloride (10.4 g.) is then added in small increments followed by a solution of 16 g. of bromine in 20 ml. of chloroform. The reaction flask is then heated at reduced pressures until the chloroform is substantially removed. The residue is then poured on a mixture of water and ice, whereupon the reaction mixture partially solidifies. The solid is separated by filtration, dissolved in benzene and recrystallized. The resulting product, 3,3-dibromo-2-ketohexamethyleneimine, has a melting point between 158–160° C.

*Example 8*

A solution of 11.3 g. of caprolactam and 100 ml. of chloroform is cooled to 1° C. and 20.8 g. of phosphorus pentachloride is added in half-gram increments over a period of about 30 minutes. The reaction temperature is maintained between 1 and 9° C. by immersing the reaction flask in an ice bath. After all of the phosphorus pentachloride has been added, the ice bath is removed and the reaction mixture warms to room temperature. The solution is then treated with chlorine gas until saturated, approximately 0.2 mol of chlorine being used. The chloroform is then removed by heating at reduced pressures, while maintaining the temperature below 40° C. The residue is poured into ice water and the solid product which precipitates is separated. After filtering and washing with a minimum quantity of water and a smaller quantity of ether, the 3,3-dichloro-2-ketohexamethyleneimine having a melting point of 124–126° C. is recovered in a yield of 90.7 percent.

*Example 9*

The procedure of the preceding example is duplicated except that a smaller quantity of chloroform (50 ml.) is used for the reaction, and the temperature is maintained between −5° C. and +1° C. during the addition of the phosphorus pentachloride. After all of the reagents are combined, chlorine gas is passed into the reaction mixture until the saturation point is reached. An 85.7 percent yield of 3,3-dichloro-2-ketohexamethyleneimine is recovered.

*Example 10*

A 500 ml. reaction flask is charged with 250 ml. and 2.6 g. of caprolactam. A stoichiometric amount of phosphorus trichloride is added drop-wise during a period of 11 minutes. The reaction temperature is maintained at 23–36° C. The mixture is then chlorinated to saturation and the products separated as described in the preceding paragraph. A high yield of 3,3-dichloro-2-ketohexamethyleneimine is prepared.

What is claimed is:

1. The method of preparing 3,3-dihalo-2-ketohexamethyleneimine which comprises reacting ε-caprolactam with a halogenating reagent which has the ability to convert carboxylic acids to the corresponding acid halides, thereafter treating the reaction product with elemental halogen having an atomic weight between 30 and 90, contacting the reaction mixture with water, and separating the precipitated product from the aqueous medium.

2. The method of preparing 3,3-dihalo-2-ketohexamethyleneimine which comprises reacting ε-caprolactam in an organic solvent with a halogenation reagent selected from the group consisting of phosphorus pentachloride, phosgene, thionyl chloride, phosphorus pentabromide, carbonyl bromide, thionyl bromide, phosphorus tribromide and phosphorus trichloride; thereafter reacting the resulting product with a compound consisting of chlorine, bromine, sulfuryl chloride, and sulfuryl bromide; contacting the resulting reaction mass with water at a temperature sufficiently low to crystallize the product; and separating the desired product from the aqueous medium by filtration.

3. A method of preparing 3,3-dihalo-2-ketohexamethyleneimine which comprises reacting ε-caprolactam dissolved in a polar organic solvent with approximately a stoichiometric proportion of a halogenation reagent having the ability to convert carboxylic acids into the corresponding carboxylic acid halides, at a temperature below the reflux temperature; thereafter saturating the reaction medium with a halogen having an atomic weight between 30 and 90 formed in situ by dissociation of a compound containing said halogen, contacting the resulting reaction mixture with cold water and separating the desired product.

4. The method defined by claim 2 wherein the second stage halogenating reagent is chlorine.

5. The method defined by claim 2 wherein ε-caprolactam is reacted with phosphorus pentachloride.

6. The method defined by claim 2 wherein ε-caprolactam is reacted with phosgene.

7. The method defined by claim 2 wherein ε-caprolactam is reacted with thionyl chloride.

8. The method of claim 4 wherein the chlorine is produced in situ by the dissociation of a chlorine containing compound.

9. A method of preparing 2,3-dihalo-2-ketohexamethyleneimine which comprises reacting ε-caprolactam dissolved in a chlorinated hydrocarbon solvent with approximately a stoichiometric proportion of a phosphorus halide, said reaction being conducted at subnormal temperatures, thereafter treating the reaction product with a halogen having an atomic weight between 30 and 90, contacting the reaction mixture with water and separating the precipitated product from the aqueous medium.

10. The method of preparing 2,3-dichloro-2-ketohexamethyleneimine which comprises reacting ε-caprolactam dissolved in a chlorinated hydrocarbon solvent with approximately a stoichiometric proportion of a phosphorus halide in which the halogen has a molecular weight between 30 and 90 at temperatures between $-40°$ C. and $+10°$ C., thereafter treating the reaction product with chlorine, contacting the reaction mixture with water and separating the precipitated product from the aqueous medium.

11. The method of claim 9 wherein the second stage halogenating reagent is chlorine.

12. The method of claim 9 wherein ε-caprolactam is reacted with phosphorus pentachloride.

13. The method of claim 3 wherein ε-caprolactam is reacted with phosgene.

14. The method of claim 3 wherein ε-caprolactam is reacted with thionyl chloride.

15. The method of claim 11 wherein the chlorine is produced in situ by the dissociation of a chlorine containing compound.

No references cited.